United States Patent
Imanaka

(10) Patent No.: US 11,942,808 B2
(45) Date of Patent: Mar. 26, 2024

(54) ENERGY STORAGE APPARATUS, EXTERNAL DISCHARGE DEVICE, AND DISCHARGE METHOD OF ENERGY STORAGE DEVICE

(71) Applicant: GS Yuasa International Ltd., Kyoto (JP)

(72) Inventor: Yuki Imanaka, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 701 days.

(21) Appl. No.: 17/056,996

(22) PCT Filed: May 16, 2019

(86) PCT No.: PCT/JP2019/019420
§ 371 (c)(1),
(2) Date: Nov. 19, 2020

(87) PCT Pub. No.: WO2019/225451
PCT Pub. Date: Nov. 28, 2019

(65) Prior Publication Data
US 2021/0194263 A1 Jun. 24, 2021

(30) Foreign Application Priority Data
May 21, 2018 (JP) .................... 2018-097029

(51) Int. Cl.
*H02J 7/00* (2006.01)
*H01M 10/0525* (2010.01)
(Continued)

(52) U.S. Cl.
CPC ..... *H02J 7/00306* (2020.01); *H01M 10/0525* (2013.01); *H01M 10/4257* (2013.01);
(Continued)

(58) Field of Classification Search
None
See application file for complete search history.

(56) References Cited

U.S. PATENT DOCUMENTS 5,119,009 A * 6/1992 McCaleb ............ H01M 50/574
429/105
6,191,555 B1 2/2001 Konishi et al.
(Continued)

FOREIGN PATENT DOCUMENTS

EP 3 151 308 A1 4/2017
JP H06-351165 A 12/1994
(Continued)

OTHER PUBLICATIONS

International Search Report (ISR) (PCT Form PCT/ISA/210), in PCT/JP2019/019420, dated Jul. 30, 2019.

*Primary Examiner* — Leigh M Garbowski
(74) *Attorney, Agent, or Firm* — McGinn I.P. Law Group, PLLC

(57) ABSTRACT

The energy storage apparatus includes an energy storage device, a circuit breaker connected in series with the energy storage device, a reception unit that receives a discharge instruction to discharge remaining electric power of the energy storage device, and a management unit. The management unit executes protection processing of opening, when a state of charge of the energy storage device drops below a predetermined threshold value, the circuit breaker to protect the energy storage device from overdischarging, and protection release processing of releasing protection of the energy storage device when the discharge instruction is received by the reception unit.

12 Claims, 7 Drawing Sheets

(51) Int. Cl.
*H01M 10/42* (2006.01)
*H01M 10/44* (2006.01)
*H01M 10/48* (2006.01)
*H01G 9/00* (2006.01)

(52) U.S. Cl.
CPC ......... *H01M 10/441* (2013.01); *H01M 10/48* (2013.01); *H02J 7/0063* (2013.01); *H01G 9/0003* (2013.01); *H01M 2010/4271* (2013.01); *H01M 2220/20* (2013.01)

(56) References Cited

U.S. PATENT DOCUMENTS

| | | | | |
|---|---|---|---|---|
| 8,466,659 | B2* | 6/2013 | Shipp | A61B 17/34 320/135 |
| 8,981,724 | B2* | 3/2015 | Klein | H02J 7/0063 320/127 |
| 9,586,489 | B2* | 3/2017 | Klein | B60L 50/00 |
| 2015/0200535 | A1 | 7/2015 | Uesugi et al. | |
| 2017/0018819 | A1 | 1/2017 | Toya et al. | |
| 2019/0074683 | A1 | 3/2019 | Uesugi et al. | |

FOREIGN PATENT DOCUMENTS

| | | | |
|---|---|---|---|
| JP | H06351165 | A * | 12/1994 |
| JP | H07-211356 | A | 8/1995 |
| JP | 2000-350375 | A | 12/2000 |
| JP | 2003-142162 | A | 5/2003 |
| JP | 2008-040471 | A | 2/2008 |
| JP | 2012-055116 | A | 3/2012 |
| JP | 2013-247741 | A | 12/2013 |
| JP | 2015-131380 | A | 7/2015 |
| JP | 2016-507862 | A | 3/2016 |
| JP | WO2016/006152 | A1 | 4/2017 |

* cited by examiner

ENERGY STORAGE APPARATUS, EXTERNAL DISCHARGE DEVICE, AND DISCHARGE METHOD OF ENERGY STORAGE DEVICE

TECHNICAL FIELD

The technology disclosed in the present specification relates to an energy storage apparatus, an external discharge device, and a discharge method for an energy storage device.

BACKGROUND ART

In an energy storage apparatus including an energy storage device such as a lithium-ion battery, it is known that a circuit breaker is provided in a current path in which the energy storage device is provided, and if over discharge of the energy storage device is predicted, the circuit breaker is opened to prevent the energy storage device from overdischarging (see Patent Document 1, for example). A storage battery pack 100 disclosed in Patent Document 1 includes a main body unit 120, a secondary battery 101 (corresponding to an energy storage device), and a switch 104 (corresponding to a circuit breaker) connected in series with the secondary battery 101. The storage battery pack 100 opens the switch 104 when the voltage of the secondary battery 101 reaches a standard value (end-of-discharge voltage) at which discharge of the secondary battery 101 is stopped.

Generally, an energy storage apparatus is disassembled when it is discarded. When disassembling the energy storage apparatus, it is desirable to discharge remaining electric power of the energy storage device for safety of work. The storage battery pack 100 disclosed in Patent Document 1 includes a power consumption unit 105 housed in the main body unit 120, and a reception unit 114 (for example, a mechanical switch or communication unit) that receives an instruction to operate a circuit including the power consumption unit 105 from the outside. When the reception unit 114 receives the instruction, the storage battery pack 100 operates the circuit including the power consumption unit 105 to discharge the secondary battery 101.

PRIOR ART DOCUMENT

Patent Document

Patent Document 1: Republished WO 2016/006152

SUMMARY OF THE INVENTION

Problems to be Solved by the Invention

The storage battery pack 100 in Patent Document 1 described above must include the power consumption unit 105 for each storage battery pack 100, which complicates the configuration of the storage battery pack 100.

The present specification discloses a technique capable of discharging remaining electric power of an energy storage device to the end with a simple configuration while protecting the energy storage device from overdischarging.

Means for Solving the Problems

An energy storage apparatus, including: an energy storage device; a circuit breaker connected in series with the energy storage device; a reception unit that receives a discharge instruction to discharge remaining electric power of the energy storage device; and a management unit, in which the management unit executes protection processing of opening, when a state of charge of the energy storage device drops below a predetermined threshold value, the circuit breaker to protect the energy storage device from overdischarging, and protection release processing of releasing protection of the energy storage device when the discharge instruction is received by the reception unit.

Advantages of the Invention

It is possible to discharge remaining electric power of the energy storage device to the end with a simple configuration while protecting the energy storage device from overdischarging.

MODE FOR CARRYING OUT THE INVENTION

Overview of the Present Embodiment

Figure 1:
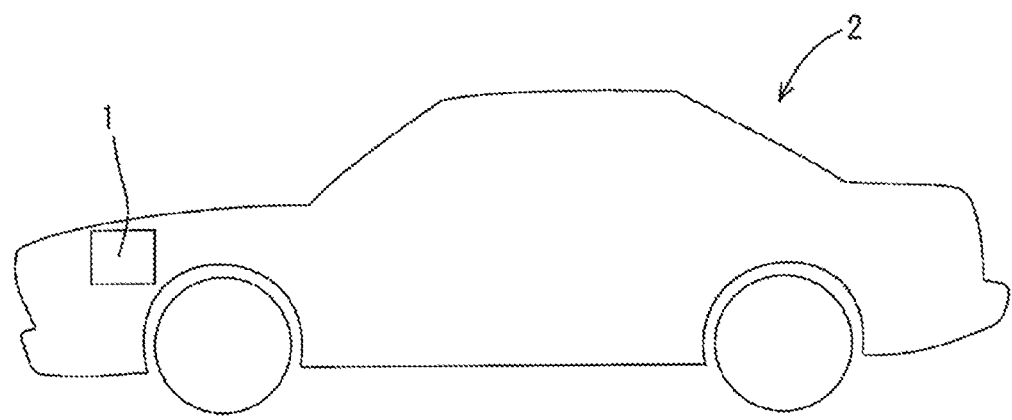
FIG. 1 is a schematic diagram of an energy storage apparatus according to a first embodiment and a vehicle equipped with the energy storage apparatus.

An energy storage apparatus, including: an energy storage device; a circuit breaker connected in series with the energy storage device; a reception unit that receives a discharge instruction to discharge remaining electric power of the energy storage device; and a management unit, in which the management unit executes protection processing of opening, when a state of charge of the energy storage device drops below a predetermined threshold value, the circuit breaker to protect the energy storage device from overdischarging, and protection release processing of releasing protection of the energy storage device when the discharge instruction is received by the reception unit.

Without provision of a discharge resistance inside the energy storage apparatus, the remaining electric power of the energy storage device is discharged using an external discharge resistance. Since the remaining electric power of the plurality of energy storage apparatuses can be discharged using one external discharge resistance, the configuration of the energy storage apparatus can be simplified as compared with the case where each energy storage apparatus is provided with a discharge resistance.

However, if the energy storage device is protected from overdischarging, the circuit breaker opens when the state of charge of the energy storage device drops below a predetermined threshold value, so that, if an external discharge resistance is used, the remaining electric power of the energy storage device cannot be discharged to the end. Therefore, unless the worker disassembles the energy storage apparatus and exposes the internal energy storage device, the remaining electric power cannot be discharged to the end, which may cause a short circuit. Alternatively, when the circuit breaker opens, the terminal voltage becomes 0 V, so the worker may disassemble the apparatus thinking that it has completely discharged, and there is a possibility of a short circuit.

According to the above energy storage apparatus, the protection of the energy storage device is released when the discharge instruction is received, so that the remaining electric power of the energy storage device can be discharged to the end also by using an external discharge resistance. Therefore, it is possible to discharge the remaining electric power of the energy storage device to the end with a simple configuration while protecting the energy storage device from overdischarging.

The management unit, in the protection release processing, if the circuit breaker is closed when receiving the discharge instruction, may set operation thereof so as not to execute the protection processing even if the state of charge of the energy storage device subsequently drops below the threshold value.

When an external discharge resistance is attached to the energy storage apparatus and the state of charge of the energy storage device has not yet dropped below a predetermined threshold value, the protection processing of the energy storage device has not been executed, and thus the circuit breaker is closed. If the circuit breaker is closed and an external discharge resistance is attached, the external discharge resistance discharges the remaining electric power of the energy storage device, but when the state of charge of the energy storage device subsequently drops below the threshold value, the protection processing is executed and the circuit breaker opens. Therefore, the remaining electric power of the energy storage device is not discharged to the end.

According to the above energy storage apparatus, if the circuit breaker is closed when receiving the discharge instruction, the apparatus sets the operation of the management unit so as not to execute the protection processing even if the state of charge of the energy storage device subsequently drops below a predetermined threshold value, so that it is possible to prevent the circuit breaker from opening to stop discharging during the discharge of the remaining electric power. Therefore, it is possible to discharge the remaining electric power of the energy storage device to the end also by using an external discharge resistance.

The management unit, in the protection release processing, if the protection processing has already been executed and the circuit breaker is open when the discharge instruction is received, may close the circuit breaker.

When the external discharge resistance is attached and the state of charge of the energy storage device has already dropped below a predetermined threshold value, the protection processing is executed and the circuit breaker is open. Therefore, in this case, even if an external discharge resistance is attached to the energy storage apparatus, the remaining electric power of the energy storage device is not discharged.

According to the above energy storage apparatus, if the circuit breaker is open when the discharge instruction is received, the circuit breaker is closed, so that the remaining electric power of the energy storage device can be discharged to the end also by using an external discharge resistance.

A housing in which the energy storage device is housed is provided, and the reception unit may receive the discharge instruction from outside the housing in a non-contact manner.

As a configuration for receiving the discharge instruction of the energy storage device, a configuration using a mechanical switch operated by a worker from the outside of the housing can be considered. However, the mechanical switch is not preferable from the viewpoint of waterproof/dustproofness of the energy storage apparatus. According to the above energy storage apparatus, since the discharge instruction is received in a non-contact manner, the waterproof/dustproofness of the energy storage apparatus can be improved as compared with the case of using a mechanical switch. Therefore, it is possible to reduce the risk that the discharge of the remaining electric power of the energy storage device is hindered by the intrusion of water or dust.

The reception unit may include a magnetic switch that is provided inside the housing and that is turned on when driven by a magnetic force from the outside of the housing, and output an electric signal to the management unit when the magnetic switch is turned on.

According to the above energy storage apparatus, a discharge instruction from the outside can be received in a non-contact manner. This can improve the waterproof/dustproofness of the energy storage apparatus, and reduce the risk that the discharge of the remaining electric power of the energy storage device is hindered by the intrusion of water or dust.

The reception unit is provided in the housing, and may include a transmission part that transmits light outside the housing to the inside of the housing, a detachable shield member that covers the transmission part from the outside of the housing, and a photoelectric switch which is provided inside the housing and turned on by receiving the light transmitted through the transmission part, and output an electric signal to the management unit when the photoelectric switch is turned on.

According to the above energy storage apparatus, a discharge instruction from the outside can be received in a non-contact manner. This can improve the waterproof/dustproofness of the energy storage apparatus, and reduce the risk that the discharge of the remaining electric power of the energy storage device is hindered by the intrusion of water or dust. According to the above energy storage apparatus, it is possible to visually judge whether or not the remaining electric power is discharged by the presence or absence of the shielding member, so that the safety during work is improved.

The energy storage device may be a lithium-ion battery.

For example, if the energy storage device is a lead-acid battery, it can be disassembled by disconnecting the lead-acid battery, but if it is a lithium-ion battery, disassembling in this way is dangerous if there is electric power remaining in the energy storage device. According to the above energy storage apparatus, the remaining electric power of the lithium-ion battery can be discharged to the end, so the safety when disassembling the lithium-ion battery is improved.

The energy storage apparatus is mounted on a vehicle, and the management unit may execute the protection release processing only when the energy storage apparatus is removed from the vehicle.

According to the above energy storage apparatus, when the energy storage apparatus is mounted on the vehicle, the protection release processing is not executed even if the discharge instruction is received. Therefore, it is possible to prevent the case in which the discharge instruction is issued in a state where the energy storage apparatus is mounted on the vehicle, and the remaining electric power of the energy storage device is discharged to the end. As a result, it is possible to reduce the possibility that the energy storage device cannot be used due to overdischarge.

The external discharge device includes a first contact connected to one of a positive electrode external terminal and a negative electrode external terminal of the energy storage apparatus, a second contact connected to the other, a discharge resistance provided in a current path connecting the first contact and the second contact, and an instruction unit for instructing the energy storage apparatus to discharge.

According to the above external discharge device, since the external discharge device instructs the energy storage apparatus to discharge, it is not necessary to perform a work for instructing discharge separately from a work of attaching the external discharge device to the energy storage apparatus during work. Therefore, the convenience during work is improved.

The technology disclosed in this specification can be realized in various modes such as an apparatus, a method, a computer program for realizing the functions of the apparatus or method, and a recording medium recording the computer program.

First Embodiment

An embodiment will be described with reference to FIGS. 1 to 6.

(1) Configuration of Energy Storage Apparatus

An energy storage apparatus 1 according to the first embodiment will be described with reference to FIG. 1. The energy storage apparatus 1 is mounted on a vehicle 2, and supplies electric power to a starter for starting an engine (an example of an internal combustion engine) of the vehicle 2 and auxiliary machineries (ECU, headlight, air conditioner, audio, etc.) mounted on the vehicle 2.

Figure 2:
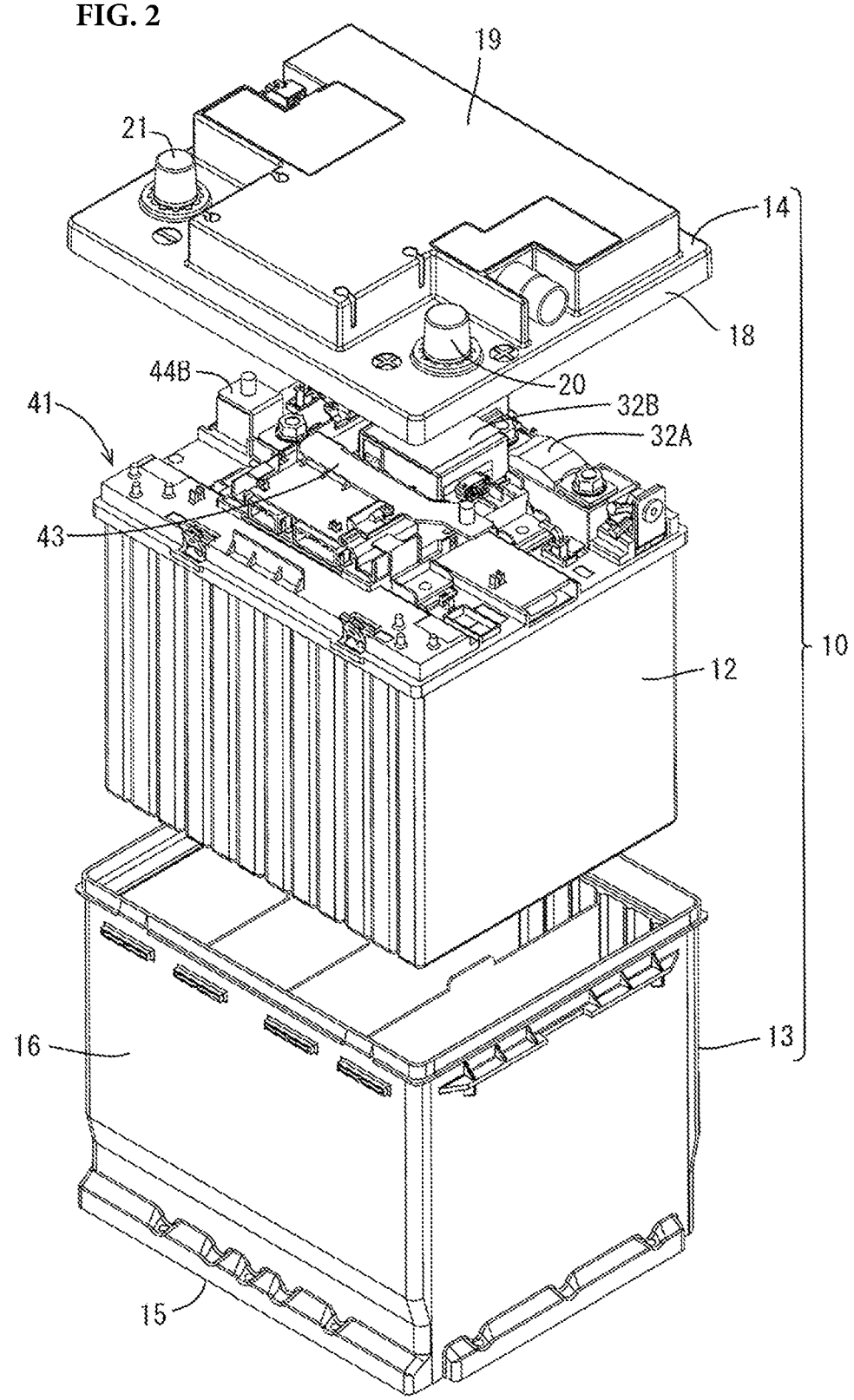
FIG. 2 is an exploded perspective view of the energy storage apparatus.

As shown in FIG. 2, the energy storage apparatus 1 includes an outer case 10 (an example of a housing), and a plurality of energy storage devices 12 housed inside the outer case 10. The outer case 10 is composed of a main body 13 and a lid body 14 made of a synthetic resin material. The main body 13 has a bottomed tubular shape, and is composed of a bottom surface portion 15 having a rectangular shape in plan view and four side surface portions 16 rising from four sides thereof to form a tubular shape. An upper opening 17 is formed in an upper end portion by the four side surface portions 16.

The lid body 14 has a rectangular shape in plan view, and a frame body 18 extends downward from four sides thereof. The lid body 14 closes the upper opening 17 of the main body 13. On the upper surface of the lid body 14, a protruding portion 19 having a substantially T-shape in plan view is formed. A positive electrode external terminal 20 is fixed to one corner portion of the two locations where the protruding portion 19 is not formed on the upper surface of the lid body 14, and a negative electrode external terminal 21 is fixed to the other corner portion.

Figure 3A:
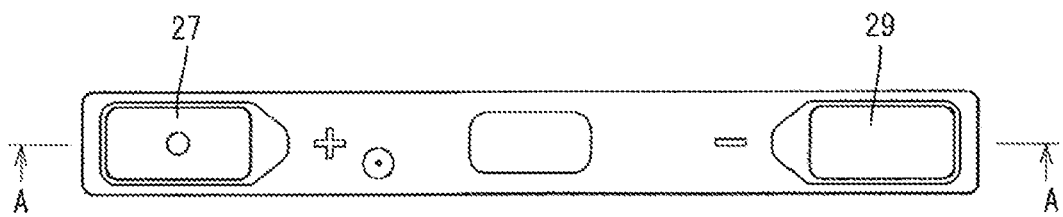
FIG. 3A is a plan view of an energy storage device shown in FIG. 2.
Figure 3B:
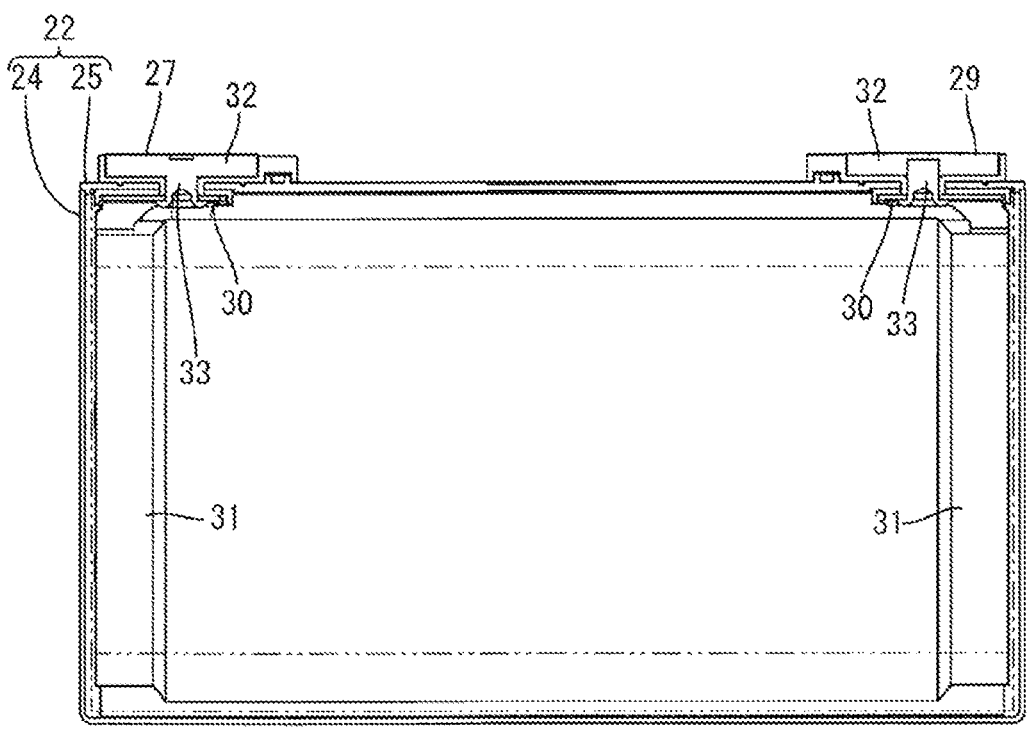
FIG. 3B is a sectional view taken along a line A-A shown in FIG. 3A.

The energy storage device 12 is a repeatedly chargeable secondary battery, and is specifically, for example, a lithium-ion battery. As shown in FIGS. 3(a) and 3(b), the energy storage device 12 has an electrode assembly housed in a rectangular parallelepiped case 22 together with a non-aqueous electrolyte. The case 22 is composed of a case body 24 and a cover 25 that closes an opening above the case body 24.

The electrode assembly, although not shown in detail, has a separator made of a porous resin film arranged between a negative electrode element formed by applying an active material to a substrate made of copper foil and a positive electrode element formed by applying an active material to a substrate made of aluminum foil. These are all belt-shaped, and are wound in a flat shape so that they can be housed in the case body 24 in a state where the negative electrode element and the positive electrode element are displaced from each other on the opposite sides in the width direction with respect to the separator.

A positive electrode terminal 27 is connected to the positive electrode element via a positive electrode current collector. A negative electrode terminal 29 is connected to the negative electrode element via a negative electrode current collector. Each of the positive electrode current collector and the negative electrode current collector has a plate-shaped pedestal portion 30 and a leg portion 31 extending from the pedestal portion 30. Through holes are formed in the pedestal portion 30. The leg portion 31 is connected to the positive electrode element or the negative electrode element. Each of the positive electrode terminal 27 and the negative electrode terminal 29 has a terminal main body portion 32 and a shaft portion 33 protruding downward from the center portion of the lower surface thereof. The terminal main body portion 32 and the shaft portion 33 of the positive electrode terminal 27 are integrally formed of aluminum (single material). In the negative electrode terminal 29, the terminal main body portion 32 is made of aluminum, the shaft portion 33 is made of copper, and these are assembled. The terminal main body portions 32 of the positive electrode terminal 27 and the negative electrode terminal 29 are arranged at both ends of the cover 25 via gaskets made of an insulating material, and are exposed to the outside from the gaskets.

Figure 4:
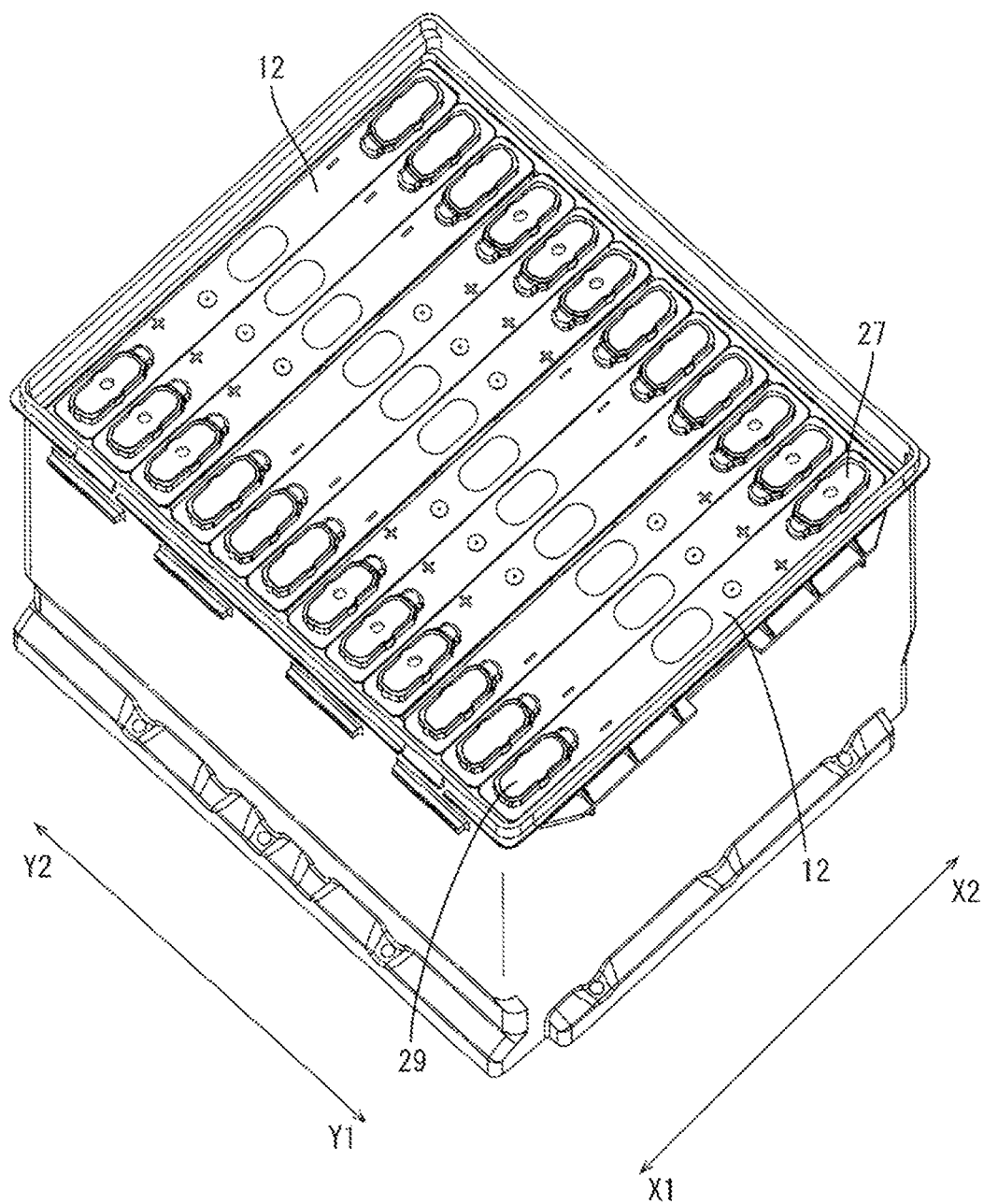
FIG. 4 is a perspective view showing a state in which the energy storage device is housed in a main body of FIG. 1.

As shown in FIG. 4, a plurality of (for example, twelve) energy storage devices 12 are housed in the main body 13 in a state of being arranged in the width direction. Here, the plurality of energy storage devices 12 are arranged from one end side to the other end side of the main body 13 (direction of arrow Y1 to Y2) with three energy storage devices 12 as one set so that in the same set, the terminal polarities of adjacent energy storage devices 12 are the same, and between adjacent sets, the terminal polarities of adjacent energy storage devices 12 are opposite to each other. In the three energy storage devices 12 (first set) located closest to the arrow Y1 side, the arrow X1 side is the negative electrode and the arrow X2 side is the positive electrode. In the three energy storage devices 12 (second set) adjacent to the first set, the arrow X1 side is the positive electrode and the arrow X2 side is the negative electrode. Furthermore, the third set adjacent to the second set has the same arrangement as the first set, and the fourth set adjacent to the third set has the same arrangement as the second set.

Figure 5:
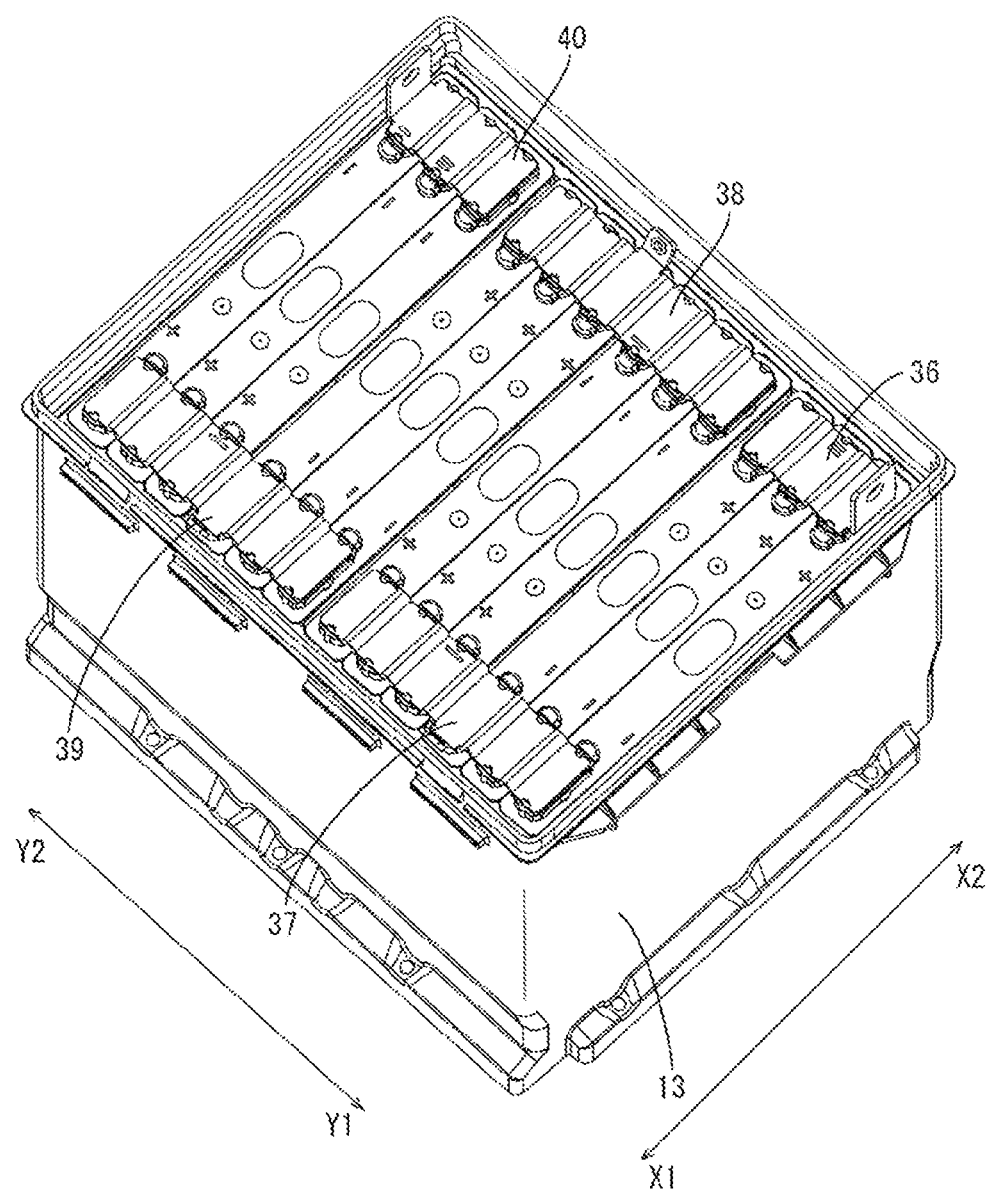
FIG. 5 is a perspective view showing a state in which a bus bar is attached to the energy storage device of FIG. 4.

As shown in FIG. 5, terminal bus bars (connecting members) 36 to 40 as conductive members are connected to the positive electrode terminal 27 and the negative electrode terminal 29 by welding. On the arrow X2 side of the first set, the positive electrode terminals 27 are connected by the first bus bar 36. Between the first set and the second set, the negative electrode terminals 29 of the first set and the positive electrode terminals 27 of the second set are connected by the second bus bar 37 on the arrow X1 side. Between the second set and the third set, the negative electrode terminals 29 of the second set and the positive electrode terminals 27 of the third set are connected by the third bus bar 38 on the arrow X2 side. Between the third set and the fourth set, the negative electrode terminals 29 of the third set and the positive electrode terminals 27 of the fourth set are connected by the fourth bus bar 39 on the arrow X1 side. On the arrow X2 side of the fourth set, the negative electrode terminals 29 are connected by the fifth bus bar 40.

Referring also to FIG. 2, the first bus bar 36 located at one end of the flow of electricity is connected to the positive electrode external terminal 20 via a first electronic device (for example, fuse), a second electronic device (for example, relay), a bus bar 43 and a bus bar terminal (not shown). The fifth bus bar 40 located at the other end of the flow of electricity is connected to the negative electrode external terminal 21 via bus bars 44A and 44B and a negative electrode bus bar terminal (not shown). As a result, each energy storage device 12 can be charged and discharged via the positive electrode external terminal 20 and the negative electrode external terminal 21. The electronic devices and the electric component connecting bus bars 43 and 44B are attached to a circuit board unit 41 arranged above the plurality of energy storage devices 12 that are stacked. The bus bar terminal is arranged on the lid body 14.

(2) Electrical Configuration of Energy Storage Apparatus

Figure 6:
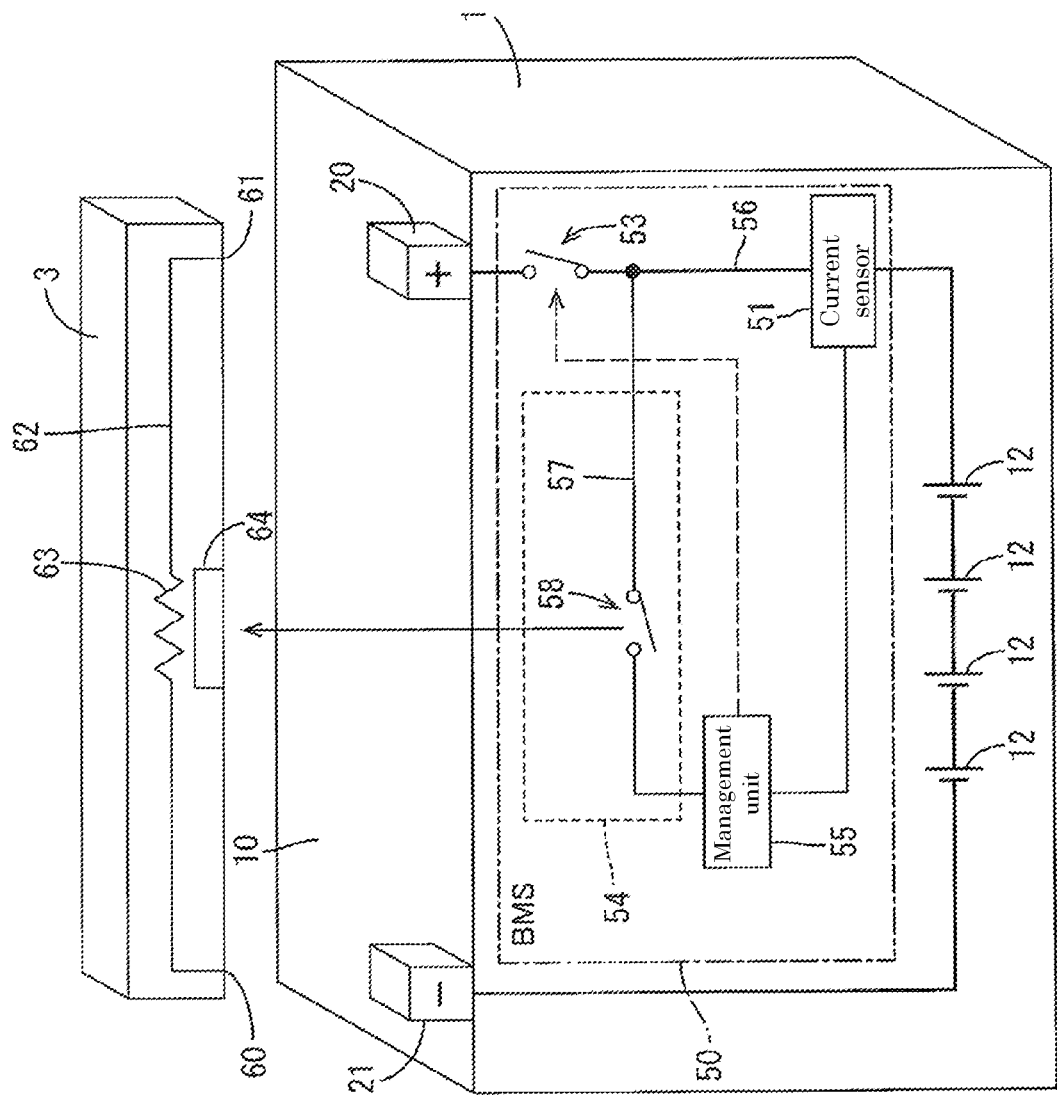
FIG. 6 is a schematic diagram showing an electrical configuration of the energy storage apparatus and a configuration of an external discharge device.

The electrical configuration of the energy storage apparatus 1 will be described with reference to FIG. 6. As shown in FIG. 6, the energy storage apparatus 1 includes a plurality of energy storage devices 12 described above and a battery management system 50 (BMS) that manages these energy storage devices 12.

The BMS 50 is mounted on the circuit board unit 41 shown in FIG. 2. The BMS 50 includes a current sensor 51, a relay 53 (an example of a circuit breaker), a reception unit 54, and a management unit 55.

The current sensor 51 is connected in series with the energy storage device 12, and measures the current value I[A] of the current flowing through the energy storage device 12 and outputs it to the management unit 55. The relay 53 is connected in series with the energy storage device 12. The relay 53 is for protecting the energy storage device 12 from overcharging and overdischarging, and is opened and closed by the management unit 55.

The reception unit 54 is for receiving a discharge instruction from the outside of the outer case 10. The reception unit 54 includes a current path 57 that branches from a current path 56 to which the energy storage device 12 is connected and is connected to the management unit 55, and a normally open relay 58 (an example of a magnetic switch) provided in the current path 57.

When a magnet is brought close to the outer case 10 from outside the outer case 10, the relay 58 is closed (that is, the relay 58 is turned on) by the magnetic force (an example of a discharge instruction) of the magnet. The end of the current path 57 on the side of the management unit 55 is connected to a predetermined input port of the management unit 55, and when the relay 58 is turned on, a voltage (an example of an electric signal) is applied to the input port of the management unit 55.

The management unit 55 operates with electric power supplied from the energy storage device 12, and includes a CPU, ROM, RAM, a communication unit, and the like. The CPU manages each unit of the energy storage apparatus 1 by executing various programs stored in the ROM.

The management unit 55 may include an ASIC (Application Specific Integrated Circuit), an FPGA (Field Programmable Gate Array), or the like instead of the CPU or in addition to the CPU.

(3) Configuration of External Discharge Device

The configuration of an external discharge device 3 will be described with reference to FIG. 6. The external discharge device 3 discharges the remaining electric power of the energy storage device 12 when the energy storage apparatus 1 is disassembled. The external discharge device 3 includes a first contact 60, a second contact 61, a current path 62, a discharge resistance 63, and a magnet 64 (an example of an instruction unit). The first contact 60 is connected to one of the positive electrode external terminal 20 and negative electrode external terminal 21 of the energy storage apparatus 1, and the second contact 61 is connected to the other one. The current path 62 connects the first contact 60 and the second contact 61. The discharge resistance 63 is provided in the current path 62. The magnet 64 is for closing the relay 58 of the energy storage device 12, and is arranged at a position near the relay 58 when the external discharge device 3 is attached to the energy storage apparatus 1.

(4) Processing Executed by Management Unit

As the processing executed by the management unit 55, the protection processing for protecting the energy storage device 12 from overdischarging and the protection release processing for releasing the protection of the energy storage device 12 will be described.

(4-1) Protection Processing

The management unit 55 estimates the state of charge (SOC) of the energy storage device 12 at predetermined time intervals, and opens the relay 53 when the SOC drops below a predetermined threshold value (an example of protection processing). As a result, the current path 56 is cut off, and the energy storage device 12 is protected from overdischarging.

A current integration method, for example, is known as a method for estimating SOC. The current integration method is a method in which the charge/discharge current of the energy storage device 12 is constantly measured by the current sensor 51 to measure the amount of electric power flowing in and out of the energy storage device 12, and this is adjusted from the initial capacity to estimate the SOC.

The SOC and the open circuit voltage (OCV) of the energy storage device 12 have a relatively accurate correlation. Therefore, instead of directly determining from the SOC whether the SOC has dropped below a predetermined threshold value, it may be determined that the SOC has dropped below a predetermined threshold value when the OCV drops below a predetermined reference value. The OCV is not necessarily a voltage when the circuit is open, but may be a voltage when the current flowing through the energy storage device 12 is below a predetermined reference value.

(4-2) Protection Release Processing

When disassembling the energy storage apparatus 1, the worker attaches the external discharge device 3 to the energy storage apparatus 1 before disassembling the energy storage apparatus 1 in order to discharge the remaining electric power of the energy storage device 12. When the external discharge device 3 is attached, the first contact 60 of the external discharge device 3 contacts the positive electrode external terminal 20 (or the negative electrode external terminal 21), and the second contact 61 contacts the negative electrode external terminal 21 (or the positive electrode external terminal 20).

When the external discharge device 3 is attached and the SOC of the energy storage device 12 has not yet dropped below the predetermined threshold value described above, the protection processing for the energy storage device 12 has not been executed, so the relay 53 is closed. When the relay 53 is closed and the external discharge device 3 is attached, the external discharge device 3 discharges the remaining electric power of the energy storage device 12. When the external discharge device 3 is attached and the remaining electric power of the energy storage device 12 is discharged, the SOC of the energy storage device 12 subsequently drops below a threshold value, and thus, the protection processing is executed during discharge of the remaining electric power, and the relay 53 opens. Therefore, the remaining electric power of the energy storage device 12 is not discharged to the end as it is.

On the other hand, when the external discharge device 3 is attached and the SOC of the energy storage device 12 has already dropped below a predetermined threshold value, the protection processing has already been executed and the relay 53 is open, so even if the external discharge device 3 is attached to the energy storage apparatus 1, the remaining electric power of the energy storage device 12 is not discharged.

Therefore, upon receiving the discharge instruction, the management unit 55 releases the protection of the energy storage device 12, so that the remaining electric power of the energy storage device 12 is discharged to the end. Specifically, when the external discharge device 3 is attached to the energy storage apparatus 1, the relay 58 is turned on by the magnetic force of the magnet 64 (the reception unit 54 receives the discharge instruction). When the relay 58 is turned on, a voltage is applied to the input port of the management unit 55. When the voltage is applied to the input port, the management unit 55 determines whether or not the relay 53 is closed.

When the relay 53 is closed, the management unit 55 sets its operation so as not to execute the protection processing even if the SOC subsequently drops below a predetermined threshold value. Therefore, even if the SOC of the energy storage device 12 drops below the threshold value after the external discharge device 3 is attached, the relay 53 is not opened, and the remaining electric power of the energy storage device 12 is discharged to the end.

On the other hand, when the relay 53 is open, the management unit 55 closes the relay 53. Therefore, even if the protection processing has been already executed and the relay 53 is open, the remaining electric power of the energy storage device 12 is discharged to the end.

(6) Effects of the Embodiment

According to the energy storage apparatus 1, without provision of the discharge resistance inside the energy storage apparatus 1, the remaining electric power of the energy storage device 12 is discharged by using the external discharge resistance 63. Thus, the remaining electric power of the plurality of energy storage apparatuses 1 can be discharged by using one discharge resistance 63. Therefore, the configuration of the energy storage apparatus 1 can be simplified as compared with the case where the discharge resistance 63 is provided for each energy storage apparatus 1. Then, according to the energy storage apparatus 1, when the discharge instruction is received, the protection of the energy storage device 12 is released, so that the remaining electric power of the energy storage device 12 can be discharged to the end also by using the external discharge resistance 63. Therefore, according to the energy storage apparatus 1, it is possible to discharge the remaining electric power of the energy storage device 12 to the end with a simple configuration while protecting the energy storage device 12 from overdischarging.

According to the energy storage apparatus 1, if the relay 53 is closed when the discharge instruction is received, the apparatus sets its operation so as not to execute the protection processing even if the SOC of the energy storage device 12 subsequently drops below a predetermined threshold value. Therefore, it is possible to prevent the case in which the relay 53 opens during discharge of the remaining electric power to stop the discharge. Therefore, the remaining electric power of the energy storage device 12 can be discharged to the end also by using the external discharge resistance 63.

According to the energy storage apparatus 1, when the discharge instruction is received, the relay 53 is closed when the protection processing has been already executed and the relay 53 is open, so that the remaining electric power of the energy storage device 12 can be discharged to the end also by using the external discharge resistance 63.

According to the energy storage apparatus 1, since the discharge instruction from the outside of the outer case 10 is received in a non-contact manner, the waterproof/dustproofness of the energy storage apparatus 1 can be improved as compared with the case of using a mechanical switch. Accordingly, it is possible to reduce the risk that the discharge of the remaining electric power of the energy storage device 12 is hindered by the intrusion of water or dust.

According to the energy storage apparatus 1, since it includes the relay 58 that is closed when driven by the magnetic force from the outside of the outer case 10, the discharge instruction from the outside of the outer case 10 can be received in a non-contact manner. As a result, the waterproof/dustproofness of the energy storage apparatus 1 can be improved, and the risk that the discharge of the remaining electric power of the energy storage device 12 is hindered by the intrusion of water or dust can be reduced.

According to the energy storage apparatus 1, the remaining electric power of the lithium-ion battery can be discharged to the end, and therefore the safety when disassembling the lithium-ion battery is improved.

According to the external discharge device 3, since the external discharge device 3 instructs the energy storage apparatus 1 to discharge, it is not necessary to perform the work of instructing discharge separately from the work of attaching the external discharge device 3 to the energy storage apparatus 1 during work. Therefore, the convenience during work is improved.

Second Embodiment

Figure 7:
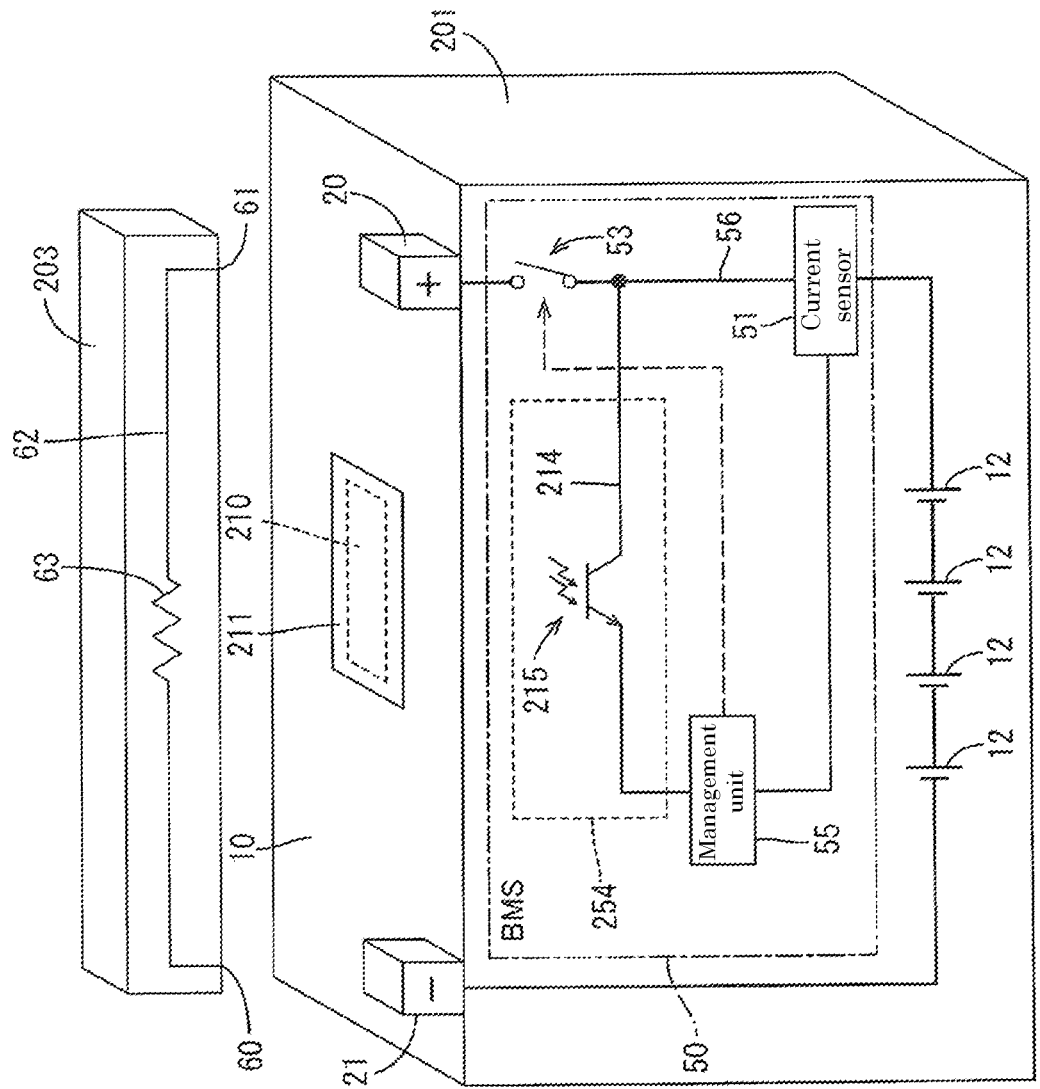
FIG. 7 is a schematic diagram showing an electrical configuration of an energy storage apparatus according to a second embodiment and a configuration of an external discharge device.

The second embodiment will be described with reference to FIG. 7. An energy storage apparatus 201 according to the second embodiment is different from the energy storage apparatus 1 according to the first embodiment in the configuration of a reception unit 254 and the configuration of an external discharge device 203.

(2-1) Electrical Configuration of Energy Storage Apparatus

The electrical configuration of the energy storage apparatus 201 will be described with reference to FIG. 7. The outer case 10 of the energy storage apparatus 201 is formed with an opening for allowing light to enter the inside of the outer case 10. The reception unit 254 receives the discharge instruction by receiving light incident from the opening, not by the magnetic force from the outside.

Specifically, the reception unit 254 includes a transmission part 210, a shielding member 211, a current path 214, and a phototransistor 215 (an example of a photoelectric switch).

The transmission part 210 closes the above-mentioned opening and transmits light to the inside of the outer case 10, and is specifically transparent glass or plastic. The shielding member 211 is, for example, a seal (hereinafter referred to as a seal 211) that does not transmit light, and is detachably attached to the transmission part 210 from the outside of the outer case 10.

The current path 214 is branched from the current path 56 to which the energy storage device 12 is connected and is connected to the management unit 55. The phototransistor 215 is provided in the current path 214. The phototransistor 215 closes when it receives light. When the phototransistor 215 is closed, a voltage (an example of an electric signal) is applied to the input port of the management unit 55.

(2-2) Configuration of External Discharge Device

The configuration of the external discharge device 203 will be described with reference to FIG. 7. The external discharge device 203 is substantially the same as the external discharge device 3 according to the first embodiment except that the magnet 64 is not provided.

(2-3) Protection Release Processing

When disassembling the energy storage apparatus 201, the worker peels off the seal 211 before (or after) attaching the external discharge device 203 to the energy storage apparatus 201. When the seal 211 is peeled off, external light is received by the phototransistor 215, and a voltage is applied to the input port of the management unit 55. When the voltage is applied to the input port, the management unit 55 executes the protection release processing described in the first embodiment.

(2-4) Effect of Embodiment

According to the energy storage apparatus 201, since it includes the phototransistor 215 that receives light from the outside of the outer case 10, a discharge instruction from the outside of the outer case 10 can be received in a non-contact manner. Accordingly, the waterproof/dustproofness of the energy storage apparatus 201 can be improved, and the risk that the discharge of the remaining electric power of the energy storage device 12 is hindered by the intrusion of water or dust can be reduced.

According to the energy storage apparatus 201, whether or not the remaining electric power is discharged can be visually determined by the presence or absence of the seal 211, so that the safety during work is improved.

Other Embodiments

The technology disclosed in the present specification is not limited to the embodiments described by the above description and the drawings, and, for example, the following embodiments are also included in the technical scope disclosed in the present specification.

(1) In the first embodiment, the case where the external discharge device 3 is provided with the magnet 64 has been described as an example, but the external discharge device 3 may not include the magnet 64 as in the second embodiment. In that case, the worker may manually bring the magnet 64 close to the outer case 10 to turn on the relay 58. In that case, the worker may leave the magnet 64 brought close to the outer case 10 as it is. By doing so, it is possible to visually judge whether or not the remaining electric power is discharged by the presence or absence of the magnet 64, so that the safety during work is improved.

(2) In the above-described first embodiment, the case where the protection release processing is executed when the external discharge device 3 is attached regardless of whether or not the energy storage apparatus 1 is mounted on the vehicle 2 has been described as an example. On the other hand, the management unit 55 may execute the protection release processing only when the energy storage apparatus 1 is removed from the vehicle 2. With this configuration, when the energy storage apparatus 1 is mounted on the vehicle 2, the protection release processing is not executed even if the discharge instruction is received, so that it is possible to prevent the case in which the discharge instruction is issued in a state where the energy storage apparatus 1 is mounted on the vehicle 2, and the remaining electric power of the energy storage device 12 is discharged to the end. As a result, it is possible to reduce the possibility that the energy storage device 12 cannot be used due to overdischarge.

Whether or not the energy storage apparatus 1 is mounted on the vehicle 2 can be determined, for example, from a signal transmitted from the vehicle 2 to the energy storage apparatus 1. Specifically, in general, the energy storage apparatus 1 receives a signal that represents the state of an engine from the vehicle 2 at regular time intervals. Therefore, the management unit 55 may determine that it is mounted on the vehicle 2 when the signal is received from the vehicle 2 at regular time intervals, and may determine that it is not mounted on the vehicle 2 when the signal is not received even after the constant time elapses.

(3) Although the relay 53 is described as an example of the circuit breaker in the above embodiment, the circuit breaker is not limited to this. For example, the circuit breaker may be an FET (Field effect transistor).

(4) In the above embodiment, the case where the discharge instruction is received in a non-contact manner by the magnetic force or light from the outside has been described as an example, but the discharge instruction may be received by the mechanical switch, or the discharge instruction may be received via the communication unit included in the management unit 55.

(5) In the above embodiment, as the configuration for receiving the discharge instruction in a non-contact manner, the case where it is received by magnetic force or light has been described as an example. However, the configuration in which the discharge instruction is received in a non-contact manner is not limited to this. For example, the discharge instruction may be received by wireless communication.

(6) In the above second embodiment, a seal is described as an example of the shielding member 211, but the shielding member 211 is not limited to a seal as long as it is detachable and covers the transmission part 210 from the outside of the outer case 10. For example, a plate material made of plastic and having a light shielding property may be detachably fixed with a screw or the like. A light-shielding cloth material may be attached with an adhesive or the like.

(7) In the above first embodiment, the case where the external discharge device 3 includes the magnet 64 as the instruction unit has been described as an example, but the instruction unit is not limited to the magnet 64. For example, when the energy storage apparatus 1 receives a discharge instruction by wireless communication, the instruction unit may be a transmission unit that transmits a discharge instruction to the energy storage apparatus 1. When the energy storage apparatus 1 receives a discharge instruction with a push button switch (mechanical switch), it may be a protruding portion that is protruding from the external discharge device so that the push button switch is pressed when the external discharge device is attached to the energy storage apparatus.

(8) In the above first embodiment, the case where the energy storage apparatus 1 is mounted on the vehicle 2 has been described as an example, but the energy storage apparatus 1 is not limited to being mounted on the vehicle 2. For example, the energy storage apparatus 1 may be used in an energy storage system installed in a business office or the like and storing electric power. It may be mounted on an aircraft or a ship and used for driving. It may be an uninterruptible power supply (UPS) that supplies electric power to electrical equipment when the system loses power.

(9) In the above embodiment, the case where the management unit 55, in the protection release processing, executes both of a process of setting its operation so as not to execute the protection processing if the relay 53 is closed when the discharge instruction is received, even if the SOC subsequently drops below the threshold value, and a process of closing the relay 53 when the discharge instruction is received and the protection processing has already been executed and the relay 53 is open, has been described as an example. On the other hand, only one of these processes may be executed.

(10) In the above embodiment, the lithium-ion battery is described as an example of the energy storage device 12, but the energy storage device 12 may be, for example, a lead storage battery or a capacitor that causes an electrochemical reaction.

DESCRIPTION OF REFERENCE SIGNS

1: energy storage apparatus
2: vehicle
3: external discharge device
10: outer case (an example of housing)
12: energy storage device
20: positive electrode external terminal
21: negative electrode external terminal
53: relay (an example of circuit breaker)
54: reception unit
55: management unit
58: relay (an example of magnetic switch)
60: first contact
61: second contact
62: current path
63: discharge resistance
64: magnet (an example of instruction unit)
201: energy storage apparatus
203: external discharge device
210: transmission part
211: seal (an example of shielding member)
215: phototransistor (an example of photoelectric switch)
254: reception unit

The invention claimed is:

1. An energy storage apparatus, comprising:
an energy storage device;
a circuit breaker connected in series with the energy storage device;
a reception unit that receives a discharge instruction to discharge remaining electric power of the energy storage device;
a housing for housing the energy storage device, wherein the reception unit receives the discharge instruction from outside the housing in a non-contact manner; and
a management unit, wherein
the management unit executes
protection processing of opening, when a state of charge of the energy storage device drops below a predetermined threshold value, the circuit breaker to protect the energy storage device from overdischarging, and
protection release processing of releasing protection of the energy storage device when the discharge instruction is received by the reception unit, wherein
the reception unit includes
a transmission part that is provided in the housing and that transmits light outside the housing to an inside of the housing,
a detachable shield member that covers the transmission part from an outside of the housing, and
a photoelectric switch which is provided inside the housing and is turned on by receiving the light transmitted through the transmission part, and
the reception unit outputs an electric signal to the management unit when the photoelectric switch is turned on.

2. The energy storage apparatus according to claim 1, wherein
the management unit, in the protection release processing, if the circuit breaker is closed when receiving the discharge instruction, sets operation thereof so as not to execute the protection processing even if the state of charge of the energy storage device drops below the threshold value.

3. The energy storage apparatus according to claim 1, wherein
the management unit, in the protection release processing, if the protection processing has already been executed and the circuit breaker is open when the discharge instruction is received, closes the circuit breaker.

4. The energy storage apparatus according to claim 1, wherein
the reception unit includes a magnetic switch that is provided inside the housing and that is turned on when driven by a magnetic force from the outside of the housing, and outputs an electric signal to the management unit when the magnetic switch is turned on.

5. The energy storage apparatus according to claim 1, wherein
the housing has a surface on which a positive electrode external terminal and a negative electrode external terminal are fixed, and the reception unit is located between the positive electrode external terminal and the negative electrode external terminal in a normal line view of the surface.

6. The energy storage apparatus according to claim 1, wherein
the energy storage device comprises a plurality of lithium-ion batteries housed inside the housing.

7. The energy storage apparatus according to claim 1, which is mounted on a vehicle.

8. The energy storage apparatus according to claim 7, which supplies electric power to auxiliary machineries.

9. The energy storage apparatus according to claim 7, which supplies electric power to a starter that starts an engine.

10. The energy storage apparatus according to claim 7, wherein
the management unit executes the protection release processing only when the energy storage apparatus is removed from the vehicle.

11. A discharge method of an energy storage device, comprising:
opening, when a state of charge of the energy storage device drops below a predetermined threshold value, a circuit breaker connected in series with the energy storage device to protect the energy storage device from overdischarging, wherein the energy storage device is housed in a housing; and
releasing protection of the energy storage device when a discharge instruction to discharge remaining electric power of the energy storage device is received by a reception unit, wherein the reception unit receives the discharge instruction from outside the housing in a non-contact manner, wherein
the reception unit includes
a transmission part that is provided in the housing and that transmits light outside the housing to an inside of the housing,
a detachable shield member that covers the transmission part from an outside of the housing, and
a photoelectric switch which is provided inside the housing and is turned on by receiving the light transmitted through the transmission part, and
the reception unit outputs an electric signal to a management unit which executes the opening and the releasing protection, when the photoelectric switch is turned on.

12. The discharge method of an energy storage device according to claim 11, further comprising
connecting an external discharge device to a positive electrode external terminal and a negative electrode external terminal fixed to an outer casing that houses the energy storage device to discharge the remaining electric power of the energy storage device.

* * * * *